US008230450B2

(12) United States Patent
Acedo et al.

(10) Patent No.: US 8,230,450 B2
(45) Date of Patent: Jul. 24, 2012

(54) METHOD FOR EXECUTING A SOFTWARE ROUTINE IDENTIFIED IN A TASK OBJECT

(75) Inventors: Mario F. Acedo, Tucson, AZ (US);
Ezequiel Cervantes, Tucson, AZ (US);
Paul A. Jennas, II, Tucson, AZ (US);
Brian S. McCain, Mountain View, CA (US); Jason L. Peipelman, Vail, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 12/348,967

(22) Filed: Jan. 6, 2009

(65) Prior Publication Data

US 2010/0175075 A1 Jul. 8, 2010

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/328
(58) Field of Classification Search ............ 719/328
See application file for complete search history.

(56) References Cited

U.S. PATENT DOCUMENTS

| 5,369,770 | A | 11/1994 | Thomason et al. | |
|---|---|---|---|---|
| 5,903,753 | A * | 5/1999 | Bramnick et al. | 719/328 |
| 6,052,524 | A | 4/2000 | Pauna | |
| 6,823,460 | B1 | 11/2004 | Hollander et al. | |
| 7,210,148 | B2 | 4/2007 | Arnold et al. | |
| 7,458,072 | B2 | 11/2008 | Moorthy et al. | |
| 2003/0055862 | A1 | 3/2003 | Bhat | |
| 2003/0225937 | A1 | 12/2003 | Reiss et al. | |
| 2004/0131076 | A1 * | 7/2004 | Smith | 370/432 |
| 2004/0141013 | A1 | 7/2004 | Alcazar et al. | |
| 2006/0101431 | A1 | 5/2006 | Pepin et al. | |
| 2006/0112394 | A1 | 5/2006 | Asai et al. | |
| 2006/0150201 | A1 | 7/2006 | Bendapudi et al. | |
| 2006/0161618 | A1 | 7/2006 | McCain et al. | |

(Continued)

OTHER PUBLICATIONS

U.S. Appl. No. 12/183,444, filed Jul. 31, 2008 entitled Method for Executing a Software Routine Identified in a Task Object.

*Primary Examiner* — S. Sough
*Assistant Examiner* — Timothy A Mudrick
(74) *Attorney, Agent, or Firm* — Cantor Colburn LLP; Robert Sullivan

(57) ABSTRACT

A method for executing a software routine identified in a task object is provided. The method includes accessing a list of software routine identifiers associated with software routines that are executable on a computer server. The method further includes generating a task object generation command having at least a first software routine identifier, parameter data, and link task information and generating a second task object in response to the task object generation command. The second task object includes the first software routine identifier, the parameter data, and the link task information. The method further includes adding the second task object to a task execution queue on the computer server and executing the first software routine identified by the first software routine identifier in the second task object on the computer server to obtain at least a first result value, when the first flag value is a first predetermined value and the result parameter associated with the first task object corresponds to a second predetermined value.

1 Claim, 8 Drawing Sheets

U.S. PATENT DOCUMENTS

| | | |
|---|---|---|
| 2006/0259976 A1 | 11/2006 | Thompson et al. |
| 2006/0288011 A1 | 12/2006 | Gandhi et al. |
| 2007/0038940 A1 | 2/2007 | Benson et al. |
| 2007/0198571 A1 | 8/2007 | Ferguson et al. |
| 2008/0077503 A1 | 3/2008 | Zias et al. |
| 2009/0132266 A1 | 5/2009 | Kao et al. |

* cited by examiner

TASK API

SUBMIT (SOFTWARE ROUTINE IDENTIFIER, PARAMETER DATA, LINK TASK INFORMATION)

QUERY (TASK OBJECT IDENTIFIER)

CANCEL (TASK OBJECT IDENTIFIER)

MODIFY (TASK OBJECT IDENTIFIER, LINK TASK INFORMATION)

GETALLTASKS ( )

SETRESPONSEHANDLER (TASK OBJECT IDENTIFIER, RESPONSE HANDLER ADDRESS)

FIG. 4

METHOD FOR EXECUTING A SOFTWARE ROUTINE IDENTIFIED IN A TASK OBJECT

BACKGROUND OF THE INVENTION

1. Field of the Invention

This application relates to a method for executing a software routine identified in a task object.

2. Description of Background

Application programming interfaces (APIs) have been developed that implement specific tasks. However, if a programmer wants to add additional API functions, new API function declarations must be stored and compiled on both local computers and servers before executing the functions, which can require a relatively large amount of development effort.

Further, programmers have had difficulty in effectively scheduling and executing tasks in task objects in a distributed system that may depend on results from other task objects.

Accordingly, the inventors herein have recognized a need for an approved method for executing a software routine in a task object that minimizes and/or reduces the above-mentioned deficiencies.

SUMMARY OF THE INVENTION

A method for executing a software routine identified in a task object in accordance with an exemplary embodiment. The method includes accessing a list of software routine identifiers associated with software routines that are executable on a computer server, utilizing a client computer. The method further includes generating a task object generation command having at least a first software routine identifier, parameter data, and link task information. The first software routine identifier is in the list of software routine identifiers. The first software routine identifier is associated with a first software routine executable on the computer server. The parameter data is utilized by the first software routine during execution thereof The link task information has a task object identifier associated with a first task object, a result parameter associated with the first task object, and a first flag value. The method further includes generating a second task object in response to the task object generation command. The second task object includes the first software routine identifier, the parameter data, and the link task information. The method further includes adding the second task object to a task execution queue on the computer server. The method further includes executing the first software routine identified by the first software routine identifier in the second task object on the computer server to obtain at least a first result value, when a task execution thread on the computer server determines that the first flag value is a first predetermined value and the result parameter associated with the first task object corresponds to a second predetermined value. The method further includes storing the result value in a memory device.

BRIEF DESCRIPTION OF THE DRAWINGS

FIG. 4 is a more detailed schematic of the task API of FIG. 3;

DETAILED DESCRIPTION OF THE INVENTION

Figure 1:
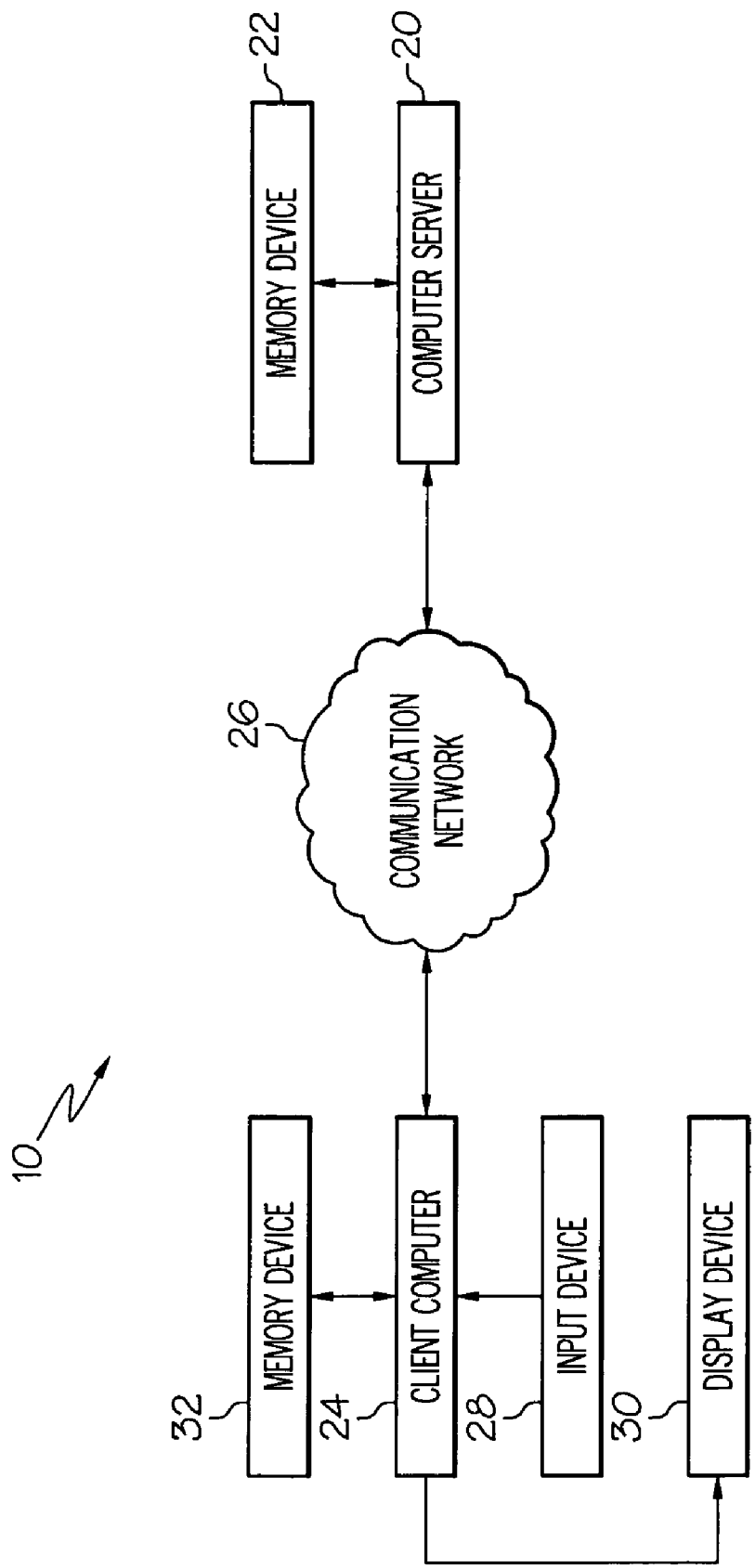
FIG. 1 is a schematic of a system for executing a software routine identified in a task object in accordance with an exemplary embodiment.

Referring to FIG. 1, a system 10 for executing software routines identified in task objects is illustrated. The system 10 includes a computer server 20, a memory device 22, a client computer 24, a communication network 26, an input device 28, a display device 30, and a memory device 32.

Figure 2:
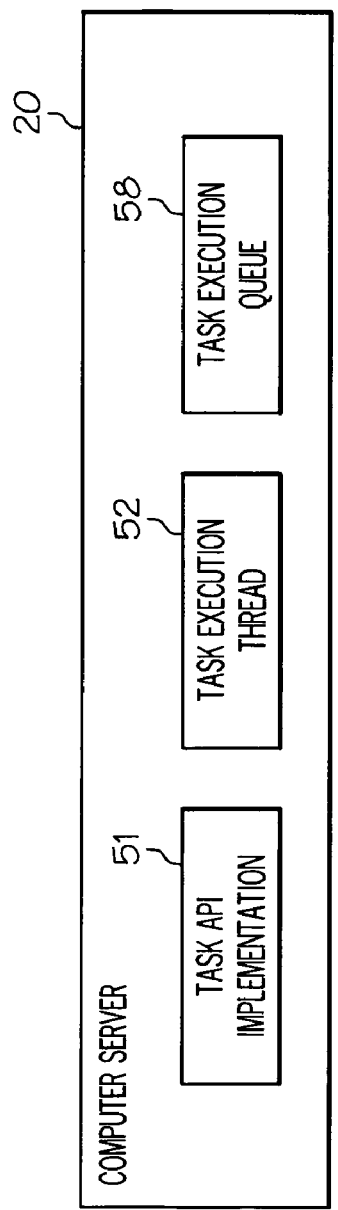
FIG. 2 is a schematic of software components executed by a computer server utilized in the system of FIG. 1.
Figure 3:
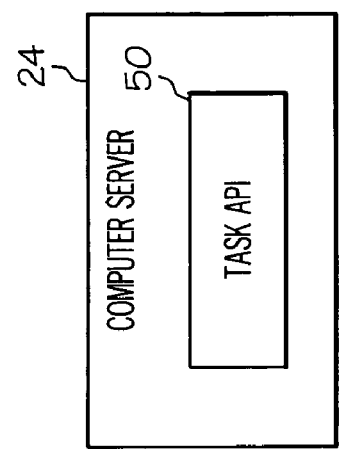
FIG. 3 is a schematic of a client computer having a task API utilized in the system of FIG. 1.

Referring to FIGS. 1, 2, and 3, in a first exemplary embodiment, the computer server 20 is provided to generate task objects and to execute API software routines identified in the task objects. In particular, the computer server 20 generates the task objects in response to task object generation commands received from the client computer 24. In a second exemplary embodiment, the computer server 20 receives task objects from the client computer 24 and executes API software routines identified in the task objects. The computer server 20 includes a task API implementation 51 having compiled software routines for implementing a task API 50, a task execution thread 52, and a task execution queue 58.

Referring again to FIG. 1, the computer server 20 is operably coupled to both the memory device 22 and to the communication network 26. The memory device 22 stores data and executable instructions utilized by the computer server 20. The communication network 26 is configured to allow bidirectional communication between the computer server 20 and the client computer 24.

In the first exemplary embodiment, the client computer 24 receives task object generation commands from the input device 28 and sends the task object generation commands through the communication network 26 to the computer server 20. The client computer 24 retrieves a list of software routines from the client computer task API 50 that can be executed on the computer server 20 utilizing "reflection" software routines, known to those skilled in the art. The list of software routines are stored in the memory device 32. The client computer 24 also displays the list of software routines on the display device 30. In the second exemplary embodiment, the client computer 24 receives task object generation commands from the input device 28 and generates task objects based on the task object generation commands. The client computer 24 also sends the task objects through the communication network 26 to the computer server 20.

Referring to FIG. 4, the client computer task API 50 will now be explained. The task API 50 includes API declarations for software routines that can be executed by the computer server 20 for generating and controlling task objects. The task API 50 includes a "submit" command that induces the computer server 20 to generate a task object. The "submit" command has the following format: submit(software routine identifier, parameter data, and link task information). The software routine identifier corresponds to an API software routine that is executable by the computer server 20. The parameter data corresponds to data utilized by the API software routine during execution thereof The link task information identifies a related/parent task object whose output parameters are utilized to determine when a software routine in a present task object, identified by the software routine identifier, is to be executed by the computer server 20. In particular, the link task information includes a parent task ID, a list of result parameters, and an execute-in-list flag (also referred to as a first flag herein). The parent task ID corresponds to a parent task object that is related to the task object being generated. The list of result parameters is a list of result parameters generated by the parent task object. The execute-in-list flag is a flag that indicates that a software routine identified by a software routine identifier in a task object is to be executed when the execute-in-list flag is a first predetermined value and at least one result parameter in the list of result parameters corresponds to a predetermined value in a list of predetermined values.

The task API 50 further includes a "query" command that queries a task object for information therein. The "query" command has the following format: query (task object identifier). The task object identifier is a unique identifier associated with a task object.

The task API 50 further includes a "cancel" command that removes a task object from the task execution queue 58. The "cancel" command has the following format: cancel(task object identifier).

The task API 50 further includes a "modify" command that modifies scheduling information associated with a software routine identified by a task object. The "modify" command has the following format: modify(task object identifier, link task information).

The task API 50 further includes a "getalltasks" command that returns task object identifiers for all of the task objects on the task execution queue 58. The "getalltasks" command has the following format: getalltasks().

The task API 50 further includes a "setresponsehandler" command that sends a message regarding a task object to a predetermined address. The "setresponsehandler" command has the following format: setresponsehandler(task object identifier, responsehandleraddress). The responsehandleraddress is an address of a receiving program.

Figure 5:
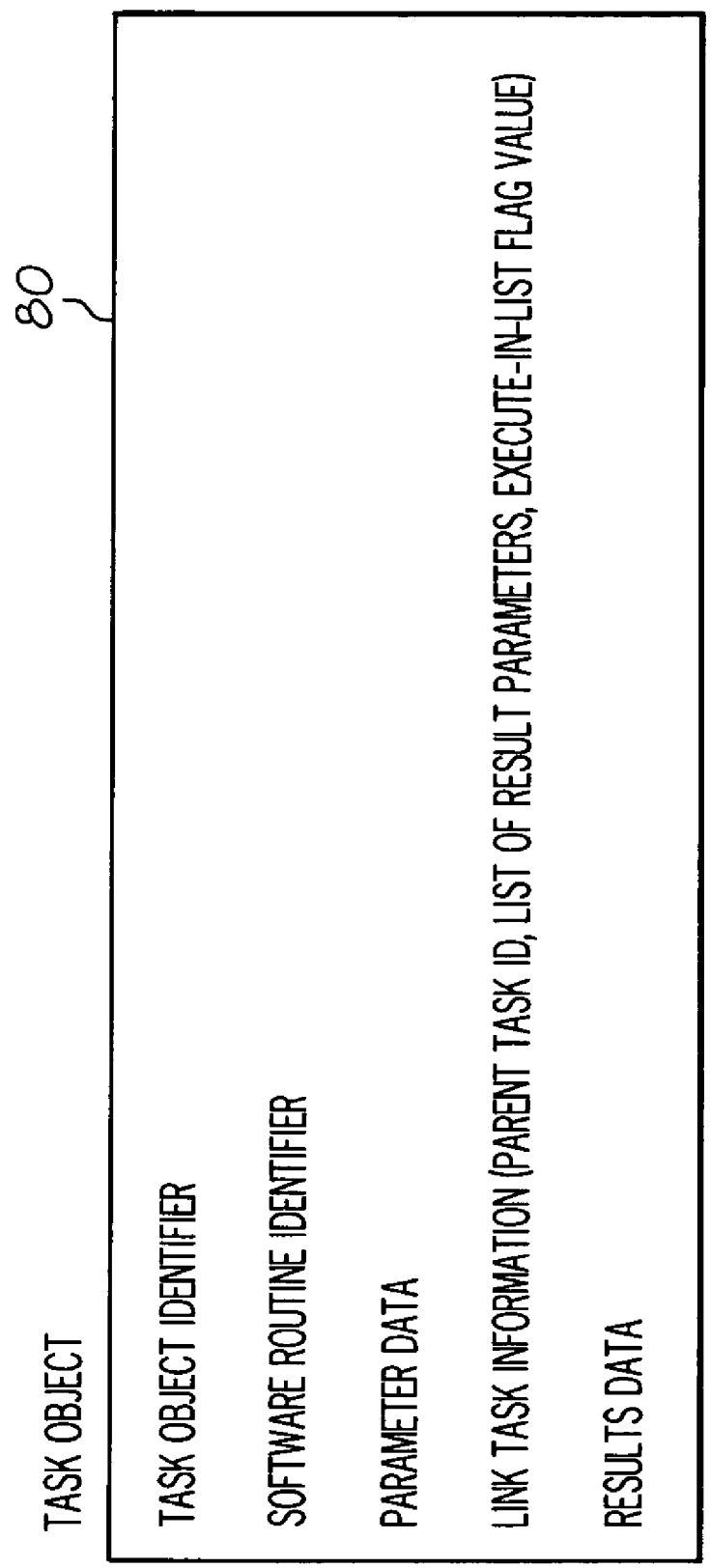
FIG. 5 is a schematic of a task object generated by the system of FIG. 1.

Referring to FIGS. 2 and 5, the task execution thread 52 is utilized by the computer server 20 to execute a software routine identified in the task object 80. The task execution queue 58 is utilized by the computer server 20 to store the task object 80 therein.

Referring to FIG. 5, the task object 80 will be explained in greater detail. In particular, the task object 80 includes: (i) a task object identifier, (ii) a software routine identifier, (iii) parameter data, (iv) link task information, and (v) results data. The task object identifier identifies a task object that is instantiated. The software routine identifier identifies a software routine within the task object. The parameter data is data utilized by the software routine within the task object. The link task information identifies a related/parent task object whose output parameters are utilized to determine when a software routine in a present task object, identified by the software routine identifier, is to be executed by the computer server 20. In particular, the link task information includes a parent task ID, a list of result parameters, and an execute-in-list flag (also referred to as a first flag herein). The results data is data generated by the software routine identified by the software routine identifier that is to be returned to a program accessing the task object 80. A task object generation command (e.g., a submit command) for generating the task object 80 can be input to the client computer 24 utilizing the input device 28.

Figure 6:
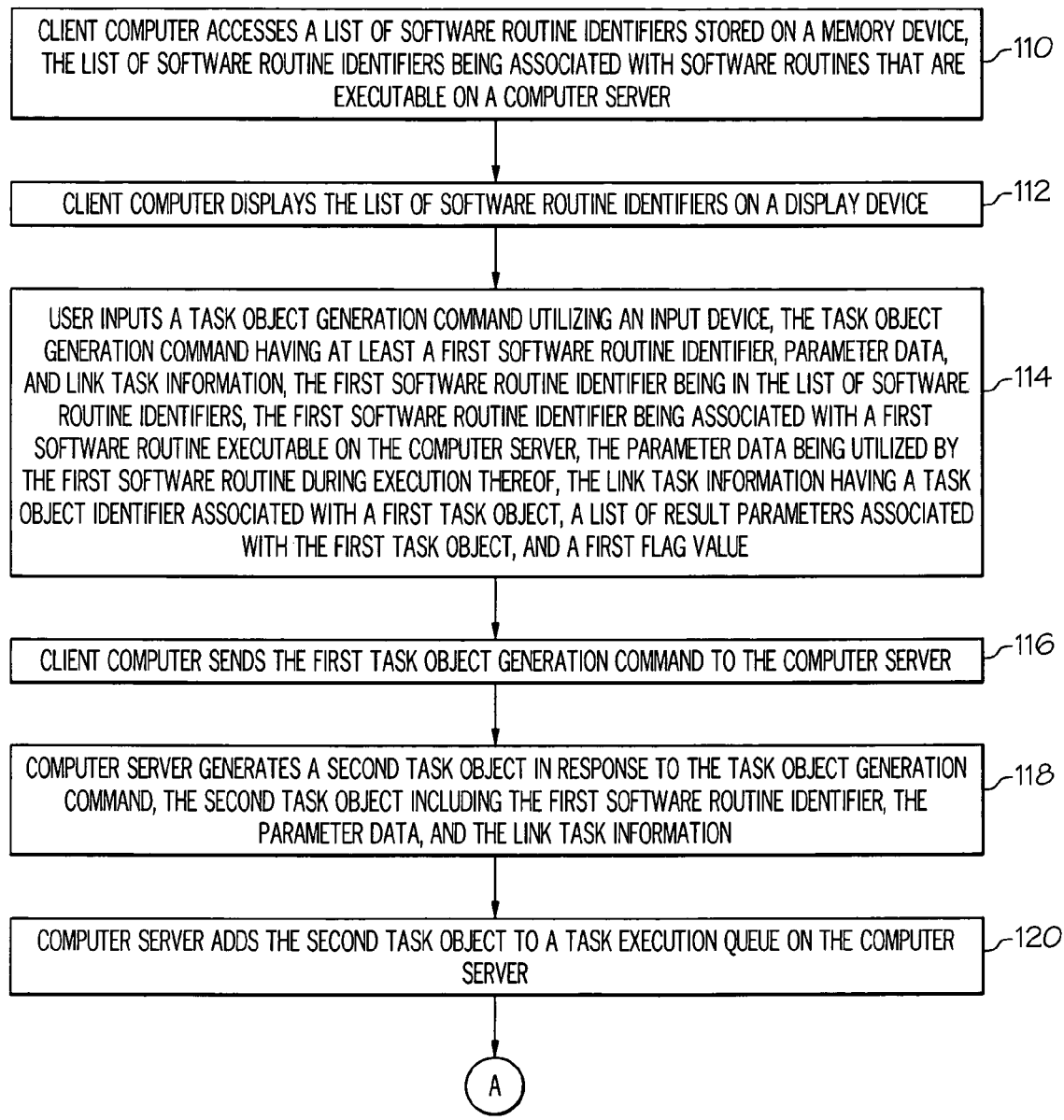
FIGS. 6 and 7 are flowcharts of a method for executing a software routine identified in a task object utilizing the system of FIG. 1, in accordance with another exemplary embodiment.
Figure 7:
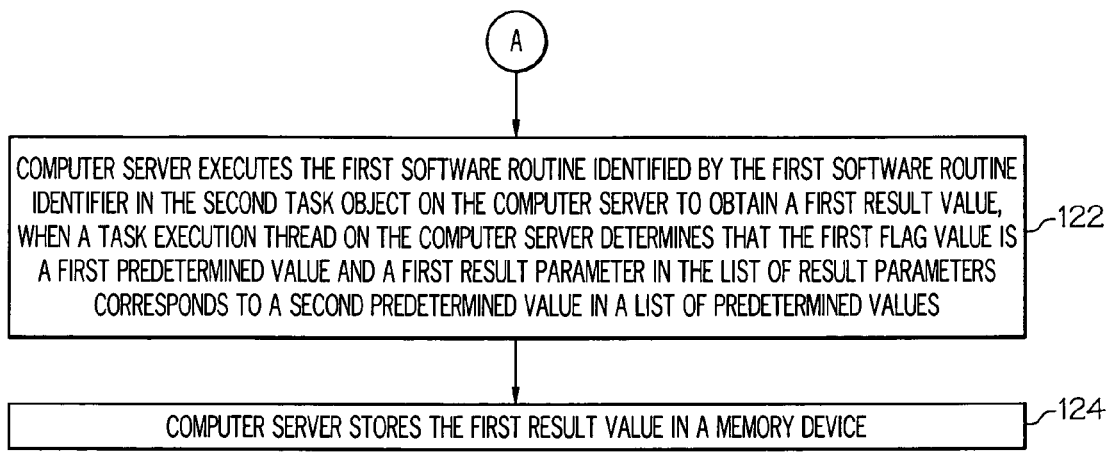

Referring to FIGS. 6 and 7, a flowchart of a method for executing software routines identified in task objects in accordance with another exemplary embodiment will now be explained.

At step 110, the client computer 24 accesses a list of software routine identifiers stored on the memory device 22. The list of software routine identifiers are associated with software routines that are executable on the computer server 20.

At step 112, the client computer 24 displays the list of software routine identifiers on the display device 30.

At step 114, the user inputs a task object generation command utilizing an input device 28. The task object generation command has at least a first software routine identifier, parameter data, and link task information. The first software routine identifier is in the list of software routine identifiers. The first software routine identifier is associated with a first software routine executable on the computer server 20. The parameter data is utilized by the first software routine during execution thereof The link task information has a task object identifier associated with a first task object, a list of result parameters associated with the first task object, and a first flag value.

At step 116, the client computer 24 sends the first task object generation command to the computer server 20.

At step 118, the computer server 20 generates a second task object in response to the task object generation command. The second task object includes the first software routine identifier, the parameter data, and the link task information.

At step 120, the computer server 20 adds the second task object to a task execution queue 58 on the computer server 20.

At step 122, the computer server 20 executes the first software routine identified by the first software routine identifier in the second task object on the computer server 20 to obtain a first result value, when the task execution thread 58 on the computer server 20 determines that the first flag value is a first predetermined value and a first result parameter in the list of result parameters corresponds to a second predetermined value in a list of predetermined values.

At step 124, the computer server 20 stores the first result value in the memory device 22.

Figure 8:
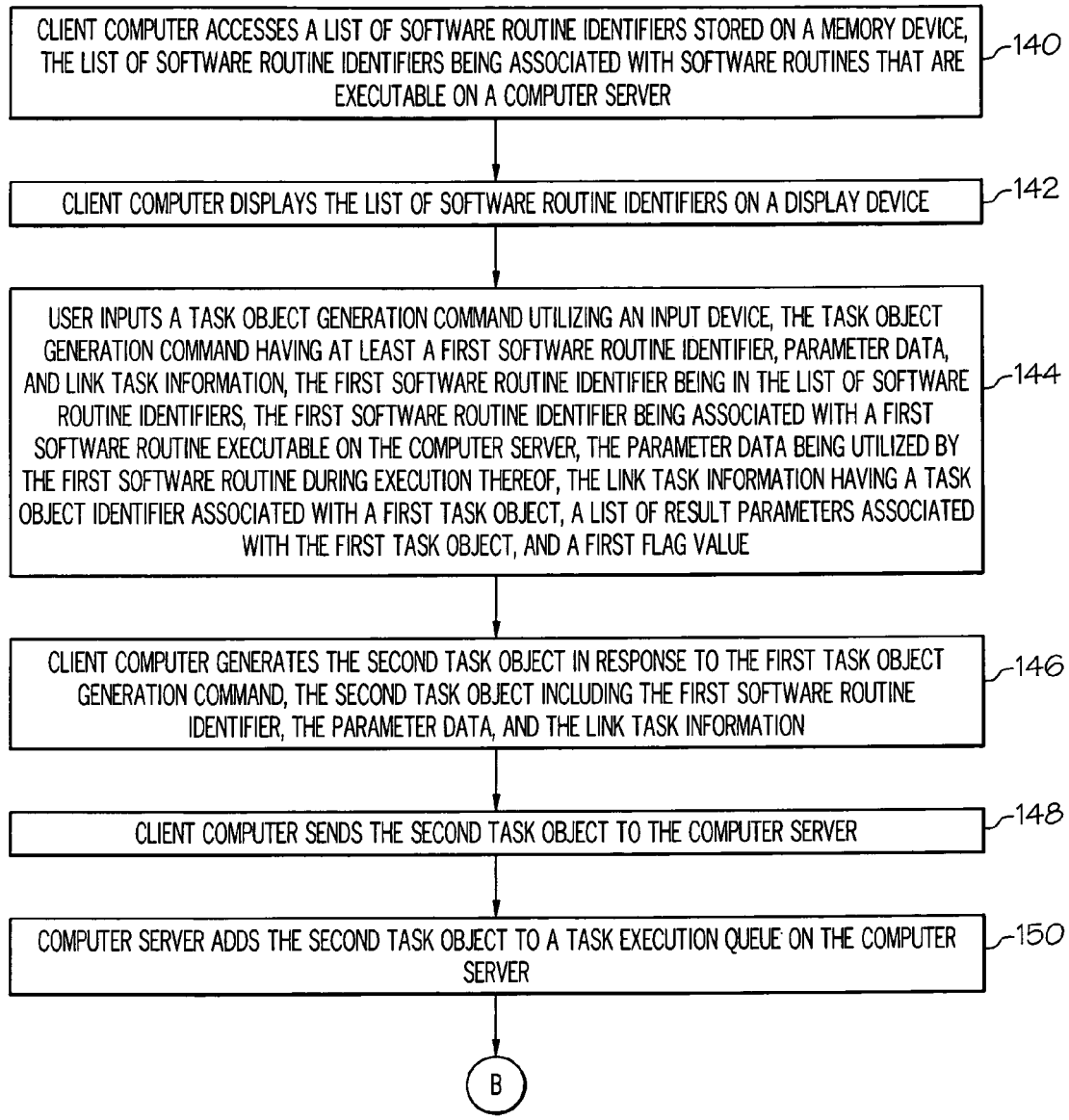
FIGS. 8 and 9 are flowcharts of another method for executing a software routine identified in a task object utilizing the system of FIG. 1, in accordance with another exemplary embodiment.
Figure 9:
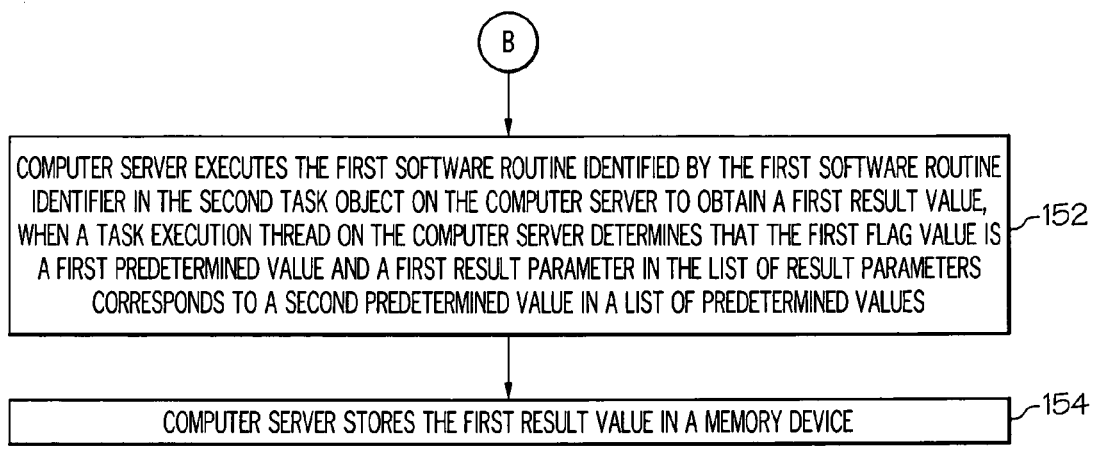

Referring to FIGS. 8 and 9, a flowchart of another method for executing software routines identified in task objects in accordance with another exemplary embodiment will now be explained.

At step 140, the client computer 24 accesses a list of software routine identifiers stored on the memory device 22. The list of software routine identifiers are associated with software routines that are executable on the computer server 20.

At step 142, the client computer 24 displays the list of software routine identifiers on the display device 30.

At step 144, the user inputs a task object generation command utilizing the input device 28. The task object generation command has at least a first software routine identifier, parameter data, and link task information. The first software routine identifier is in the list of software routine identifiers. The first software routine identifier is associated with a first software routine executable on the computer server 20. The parameter data is utilized by the first software routine during execution thereof The link task information has a task object identifier associated with a first task object, a list of result parameters associated with the first task object, and a first flag value.

At step 146, the client computer 24 generates the second task object in response to the first task object generation command. The second task object includes the first software routine identifier, the parameter data, and the link task information.

At step 148, the client computer 24 sends the second task object to the computer server 20.

At step 150, the computer server 20 adds the second task object to the task execution queue 58 on the computer server 20.

At step 152, the computer server 20 executes the first software routine identified by the first software routine identifier in the second task object on the computer server 20 to obtain a first result value, when a task execution thread on the computer server 20 determines that the first flag value is a first predetermined value and a first result parameter in the list of result parameters corresponds to a second predetermined value in a list of predetermined values.

At step 154, the computer server 20 stores the first result value in the memory device 22.

The method for executing a software routine in a task object described herein provides a substantial advantage over other methods. In particular, the method provides a technical effect of determining software routines executable on a computer server by accessing a client computer task API and then generating a task object for executing one of the software routines on the computer server when a task execution thread on the computer server determines that a flag value is a first predetermined value and a result parameter associated with a parent task object corresponds to a second predetermined value While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method for executing a software routine identified in a task object, comprising:

accessing a list of software routine identifiers associated with software routines that are executable on a computer server, utilizing a client computer;

generating a task object generation command having at least a first software routine identifier, parameter data, and link task information, the first software routine identifier being in the list of software routine identifiers, the first software routine identifier being associated with a first software routine executable on the computer server, the parameter data being utilized by the first software routine during execution thereof, the link task information having a task object identifier associated with a first task object, a result parameter associated with the first task object, and a first flag value;

generating a second task object in response to the task object generation command, the second task object including the first software routine identifier, the parameter data, and the link task information;

adding the second task object to a task execution queue on the computer server;

executing the first software routine identified by the first software routine identifier in the second task object on the computer server to obtain at least a first result value, when a task execution thread on the computer server determines that the first flag value is a first predetermined value and the result parameter associated with the first task object corresponds to a second predetermined value; and storing the result value in a memory device.

* * * * *